United States Patent
Zeng et al.

(10) Patent No.: US 8,768,174 B2
(45) Date of Patent: Jul. 1, 2014

(54) MODULATION DEVICE AND MODULATION METHOD, AND DEMODULATION DEVICE AND DEMODULATION METHOD

(75) Inventors: Tao Zeng, Wuhan (CN); Qi Yang, Wuhan (CN); Zhu Yang, Wuhan (CN); Shaohua Yu, Wuhan (CN)

(73) Assignee: Wuhan Research Institute of Posts and Telecommunications, Wuhan, Hubei Province (CN)

( * ) Notice: Subject to any disclaimer, the term of this patent is extended or adjusted under 35 U.S.C. 154(b) by 106 days.

(21) Appl. No.: 13/333,247

(22) Filed: Dec. 21, 2011

(65) Prior Publication Data

US 2013/0107341 A1    May 2, 2013

(30) Foreign Application Priority Data

Oct. 27, 2011    (CN) .......................... 2011 1 0330633

(51) Int. Cl.
| | |
|---|---|
| *H04B 10/50* | (2013.01) |
| *H04B 10/60* | (2013.01) |
| *H04B 10/548* | (2013.01) |
| *H04B 10/61* | (2013.01) |

(52) U.S. Cl.
CPC .............. *H04B 10/548* (2013.01); *H04B 10/61* (2013.01); *H04B 10/5055* (2013.01)
USPC .............................. 398/183; 398/72; 398/202

(58) Field of Classification Search
USPC ..................................... 398/183, 202, 208, 76
See application file for complete search history.

(56) References Cited

U.S. PATENT DOCUMENTS

| | | | |
|---|---|---|---|
| 4,569,073 A | 2/1986 | Kahn | |
| 5,861,781 A | 1/1999 | Ashby | |
| 7,219,037 B2 | 5/2007 | Pupalaikis et al. | |
| 7,227,911 B2 | 6/2007 | Kishi | |
| 7,580,630 B2* | 8/2009 | Kee et al. | 398/25 |
| 8,111,993 B2* | 2/2012 | Lowery et al. | 398/81 |
| 8,218,979 B2* | 7/2012 | Liu | 398/208 |
| 2009/0189651 A1 | 7/2009 | Pupalaikis | |
| 2009/0297144 A1* | 12/2009 | Djordevic et al. | 398/39 |
| 2010/0247099 A1* | 9/2010 | Lowery et al. | 398/79 |
| 2011/0280587 A1* | 11/2011 | Xie | 398/202 |

OTHER PUBLICATIONS

Article, Donald K. Weaver, "*A Third Method of Generation and Detection of Single-Sideband Signals*", Proceedings of the IRE, pp. 1703-1705, 1956.

(Continued)

*Primary Examiner* — Leslie Pascal
(74) *Attorney, Agent, or Firm* — Brinks Gilson & Lione; G. Peter Nichols

(57) ABSTRACT

A modulation device and method, and a demodulation device and method are provided. The modulation device modulates plural baseband signals to generate an optical signal, and comprises: plural modulation units for modulating plural electrical carriers with different frequencies by using the baseband signals respectively, to generate corresponding electrical modulated signals; a synthesizer for synthesizing the electrical modulated signals to generate a single electrical synthesized signal; an optical modulation unit for modulating a single optical carrier by using the electrical synthesized signal to generate the optical signal, wherein signal components corresponding to the baseband signals in the optical signal are distributed on both sides of a carrier frequency of the optical carrier at a predetermined frequency interval. Thus, processing on a high-speed baseband signal may be divided into processing on multiple relatively low-speed baseband signals, overcoming a bottleneck caused by sampling rates of a digital-analog converter and an analog-digital converter.

14 Claims, 8 Drawing Sheets

(56) References Cited

OTHER PUBLICATIONS

"*Man of High Fidelity: Edwin Howard Armstrong, a Biography*" by L. Lessing, Chapter 8 entitled The Superheterodyne Feat, published 1969, pp. 102-124.

Article (English Abstract), Wei-Liang et al., "*Exploring of AM Stereo Broadcasting of QUAM-ISB*", Radio & TV Broadcast Engineering, No. 2, 1992 (Total No. 93), pp. 21-27.

Article, Crols et al, "*A Single-Chip 900 MHz CMOS Receiver Front-End with a High Performance Low-IF Topology*", IEEE Journal of Solid-State Circuits, vol. 30, No. 12, Dec. 1995, pp. 1483-1492.

Article, Behbahani et al., "*CMOS Mixers and Polyphase Filters for Large Image Rejection*", IEEE Journal of Solid-State Circuits, vol. 36, No. 6, Jun. 2001, pp. 873-887.

Article, Shieh et al., "*107 Gb/s coherent optical OFDM transmission over 1000-km SSMF fiber using orthogonal band multiplexing*", Optics Express 2008; vol. 16, No. 9, Apr. 28, 2008, pp. 6378-6386.

Article, Jansen et al., "*121.9 Gb/s PDM-OFDM Transmission With 2-b/s/Hz Spectral Efficiency Over 1000 km of SSMF*"; Journal of Spectral Efficiency Over 1000 km of SSMF, Journal of Lightwave Technology, vol. 27, No. 3, Feb. 1, 2009, pp. 177-188.

\* cited by examiner

MODULATION DEVICE AND MODULATION METHOD, AND DEMODULATION DEVICE AND DEMODULATION METHOD

This application is based upon and claims the benefit of priority from the prior Chinese Patent Application CN201110330633.5, filed in the State Intellectual Property Office of the P.R.C. on Oct. 27, 2011, the disclosure of which is hereby incorporated by reference in its entirety.

FIELD OF THE INVENTION

The invention relates to an optical communication field, and in particularly to a modulation device and a modulation method, and a demodulation device and a demodulation method in the optical communication filed.

DESCRIPTION OF RELATED ART

Today, optical communication has developed from a conventional intensity modulation to coherent optical communication. In the coherent optical communication, an coherent optical demodulation and a DSP technique are used at a receiving side, in which a balanced receiver receives an optical signal mixed with a light generated by a local oscillating laser and performs a coherent demodulation on it to output an electrical signal, the electrical signals are sampled and quantized by an Analog-Digital Converter (ADC) to obtain a digital signals having a multi-bit precision, and then the digital signal is sent to a downstream digital signal processing device to be processed. A sampling rate of the ADC has become a major bottleneck for designing a high speed coherent optical receiver. Furthermore, if a high order QAM modulation or a coherent optical Orthogonal Frequency Division Multiplexing (OFDM) technique is utilized in the communication, not only a high speed ADC must be used at the receiving side, but also a high speed Digital-Analog Converter (DAC) must be used correspondingly at a transmitting side. Similarly, the high speed DAC becomes a major bottleneck for designing a high speed coherent optical transmitter.

In order to overcome the bottlenecks caused by the sampling rates of the DAC and the ADC, a paper published by Wei Xie, et al, titled as "107 Gb/s coherent optical OFDM transmission over 1000-km SSMF fiber using orthogonal band multiplexing" (Optics Express, 2008; 16:63 78-86), proposed orthogonal band multiplexing OFDM (OBM-OFDM) in which data are transmitted using a plurality of orthogonal optical carriers. For example, if a 100G OFDM optical signal is transmitted using one optical carrier, a signal having a 25G baud rate needs to be transmitted in case of using a QPSK modulation and polarization multiplexing, therefore an ADC and a DAC which have a 25G sampling rate are needed. However, if five orthogonal optical carriers are generated by a Ring Frequency Domain Regeneration (RFS), an optical signal with only a 5G baud rate is needed to be transmitted/received, and accordingly the requirement on the sampling rates of the ADC and the DAC is decreased to 5G. Unfortunately, one of disadvantages of this method is greatly increasing the number of optical devices used which are very expensive. In the above example, five sets of optical IQ modulation devices and five sets of optical balanced receiving devices must be used. Furthermore, in case of using a plurality of optical carriers, optical filters have to be used to separate different optical carriers, but the optical filters are not as good as electrical filters in terms of maturing degree and steep degree.

Furthermore, a paper published by Sander Lars Jansen, et al, titled as "121.9-Gb/s PDM-OFDM Transmission With 2-b/s/Hz Spectral Efficiency Over 1000 km of SSMF" (Journal of Lightwave Technology, Vol. 27 Issue 3, pp. 177-188 (2009)), proposed a scheme for implementing cross-channel (XC)-OFDM by a RF technique, and in particularly uses the following two modulation methods. (1) Individual baseband signals are modulated to different intermediate frequencies by IQ mixers, and then are modulated to optical carriers through a double-side-band modulation; this method needs optical filters to filter out image channels generated during the modulations, otherwise double bandwidths would be occupied. (2) Two baseband signals are first modulated to a same intermediate frequency by an IQ mixer, the two intermediate-frequency signals are mixed by a 4-port 90-degree directive coupler, and then two outputs of the coupler are connected to an I-terminal and a Q-terminal of an optical IQ modulator, respectively, so as to perform optical modulation; a problem of this method is that the 4-port 90-degree directive coupler performs a 90-degree phase shift on the whole intermediate-frequency signal frequency band, but in practical applications, a 90-degree phase shifter has a bandwidth limitation and can not perform an accurate phase shift on analog signals with wide bandwidths, and moreover bandwidths of signals in optical communication are often much wider than those of analog signals.

Therefore, there is a need for a modulation device and a modulation method, and a demodulation device and a demodulation method, which can modulate and demodulate a baseband signal, while reducing requirements on the sampling rates of the DAC and the ADC.

SUMMARY OF THE INVENTION

The present invention is proposed in view of the above problem. An object of the present invention is to provide a modulation device and a modulation method, and a demodulation device and a demodulation method, which can modulate and demodulate a baseband signal, while reducing requirements on the sampling rates of the DAC and the ADC.

According to an aspect of the present invention, there is provided a modulation device for modulating a plurality of baseband signals to generate an optical signal, comprising: a plurality of electrical modulation units for modulating a plurality of electrical carriers with different frequencies by using the plurality of baseband signals, respectively, to generate corresponding electrical modulated signals; a synthesizer for synthesizing the plurality of electrical modulated signals to generate a single electrical synthesized signal; and an optical modulation unit for modulating a single optical carrier by using the electrical synthesized signal to generate the optical signal, wherein signal components corresponding to the respective baseband signals in the optical signal are distributed on both sides of a carrier frequency of the optical carrier at a predetermined frequency interval.

According to another aspect of the present invention, there is provided a modulation method for modulating a plurality of baseband signals to generate an optical signal, comprising: modulating a plurality of electrical carriers with different frequencies by using the plurality of baseband signals, respectively, to generate corresponding electrical modulated signals; synthesizing the plurality of electrical modulated signals to generate a single electrical synthesized signal; and modulating a single optical carrier by using the electrical synthesized signal to generate the optical signal, wherein signal components corresponding to the respective baseband signals in the optical signal are distributed on both sides of a carrier frequency of the optical carrier at a predetermined frequency interval.

According to another aspect of the present invention, there is provided a demodulation device for demodulating an optical signal into a plurality of baseband signals, comprising: an optical demodulation unit for demodulating the optical signal into a single electrical signal by using a single optical carrier (local oscillating light), wherein a carrier frequency (local oscillating frequency) of the optical carrier is selected such that signal components corresponding to the respective baseband signals in the optical signal are distributed on both sides of the carrier frequency at a predetermined frequency interval; and a plurality of electrical demodulation units for demodulating the electrical signal by using a plurality of electrical carriers (local oscillating electrical carriers) with different frequencies, respectively, to obtain the plurality of baseband signals.

According to another aspect of the present invention, there is provided a demodulation method for demodulating an optical signal into a plurality of baseband signals, comprising: demodulating the optical signal into a single electrical signal by using a single optical carrier (local oscillating light), wherein a carrier frequency (local oscillating frequency) of the optical carrier is selected such that signal components corresponding to the respective baseband signals in the optical signal are distributed on both sides of the carrier frequency of the optical carrier at a predetermined frequency interval; and demodulating the electrical signal by using a plurality of electrical carriers (local oscillating electrical carriers) with different frequencies, respectively, to obtain the plurality of baseband signals.

In embodiments of the present invention, at a transmitting side, a baseband signal to be transmitted may be divided into multiple baseband signals, the multiple baseband signals may be modulated to different frequencies to be frequency division multiplexed, and then the frequency division multiplexed signal is used to modulate a single optical carrier; at a receiving side, the baseband signals may be obtained by demodulating a signal with different frequency components. This reduces requirements on the sampling rates of the DAC at the transmitting side and the ADC at the receiving side, and bypasses the limitation to modulation and demodulation of coherent optical communication which is applied by the ADC and the DAC. Therefore, expensive optical modulation/demodulation devices may be omitted as compared with an existing method of decreasing the sampling rates of the DAC and the ADC by modulating a plurality of optical carriers using multiple baseband signals.

BRIEF DESCRIPTION OF THE DRAWINGS

The above and other objects, features and advantages of the present invention will become apparent from the detailed description of embodiments of the present invention in conjunction with the attached drawings, in which.

DETAILED DESCRIPTION OF THE INVENTION

Figure 1:
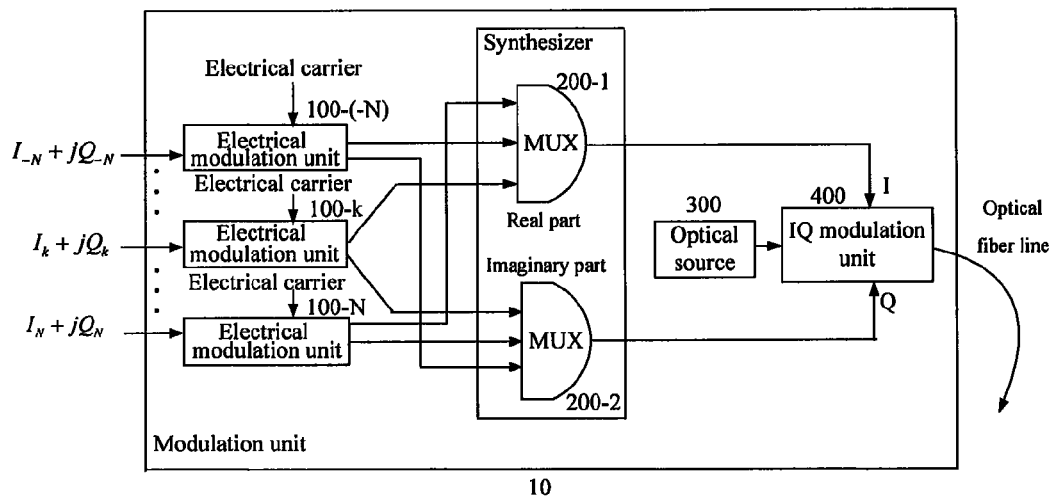
FIG. 1 is a block diagram of a modulation device according to a first embodiment of the present invention.

Thereafter, a modulation device, a modulation method, a demodulation device and a demodulation method according to embodiments of the present invention will be described with reference to the attached drawings. Throughout the drawings, like reference signs refer to like elements.

First Embodiment

A principle of a modulation device and a modulation method according to a first embodiment of the present invention will be described first.

Transmitting Side

At the transmitting side, a signal source generates multiple baseband signals which collectively carry data to be transmitted to a receiving side, instead of generating one baseband signal carrying the data. The baseband signals are transmitted to the receiving side after modulated onto an optical carrier, so as to realize data communication.

As known in the art, each of the baseband signals may be expressed as a complex form, I+jQ, which comprises two component signals, i.e. a real-part signal (component) corresponding to I in the complex form and an imaginary-part signal (component) corresponding to Q.

It is assumed that the signal source generates M baseband signals. Given M=2N+1 (N is a non-negative integer) for convenience of description, thus a k-th baseband signal may be expressed as $I_k+jQ_k$ (where k=0, 1, . . . , ±N).

In the first embodiment, firstly, M electrical carriers with different carrier frequencies are modulated by using the M baseband signals respectively to generate M electrical modulated signals. Next, these M electrical modulated signals are synthesized into a single electrical synthesized signal, and a single optical carrier is modulated by using the electrical synthesized signal to generate an optical signal. The optical signal carries the data to be transmitted by the signal source, and is transmitted to the receiving side via an optical fiber line.

If the M electrical modulated signal components in the electrical synthesized signal are all modulated to a single side of a carrier frequency of the optical carrier when performing the above optical modulation, signals on a frequency band at the other side of the carrier frequency of the optical carrier may be demodulated in when performing a demodulation. In order to avoid this, an only solution is not to use the frequency band at the other side of the carrier frequency, which, however, wastes an available frequency band in the optical fiber line. Therefore, in the embodiment of the present invention, the M electrical modulated signal components are modulated to both sides of the carrier frequency of the optical carrier when performing the above optical modulation. Preferably, by the above electrical modulation and optical modulation, the k-th baseband signal is modulated to a center frequency of $f_k=f_c+k\cdot f_0$ in a frequency domain, where $f_c$ is the carrier frequency of the optical carrier, and $f_0$ is a frequency interval between two adjacent electrical carriers (accordingly, electrical modulated signal components). It can be seen that signal components, which correspond to the respective baseband signals, in the optical signal are distributed symmetrically on two sides of $f_c$ at the frequency interval $f_0$.

Mathematically, the optical modulated signal may be expressed in a complex form:

$$(I_{-N}+jQ_{-N})\exp[j\Omega_C t+j(-N)\Omega_0 t]+\ldots+(I_k+jQ_k)\exp[j\Omega_C t+j(k)\Omega_0 t]+\ldots+(I_N+jQ_N)\exp[j\Omega_C t+j(N)\Omega_0 t] \quad (1)$$

where $\Omega_C=2\pi f_c$ is an angular frequency of the optical carrier, and $\Omega_0=2\pi f_0$ is an angular frequency interval between two adjacent electrical carriers.

In the embodiment of the present invention, instead of performing an IQ modulation on 2N+1 optical carriers by using the 2N+1 baseband signals, 2N+1 electrical carriers with different frequencies are modulated using the 2N+1 baseband signals firstly to generate 2N+1 electrical modulated signals, and then a single optical carrier is modulated using a single electrical synthesized signal obtained by synthesizing the 2N+1 electrical modulated signals, therefore the above Equation (1) may be rewritten as:

$$\left\{ \begin{array}{l} (I_{-N}+jQ_{-N})\exp[j*(-N)\Omega_0 t]+\ldots+(I_k+jQ_k)\exp[j*(k)\Omega_0 t]+\ldots+ \\ (I_N+jQ_N)\exp[j*(N)\Omega_0 t] \end{array} \right\} \quad (2)$$

$$\exp(j\Omega_C t) = (I_E+jQ_E)\exp(j\Omega_C t)$$

where $$I_E+jQ_E = \left\{ \begin{array}{l} (I_{-N}+jQ_{-N})\exp[j(-N)\Omega_0 t]+\ldots+(I_k+jQ_k)\exp[j(k)\Omega_0 t]+\ldots+ \\ (I_N+jQ_N)\exp[j(N)\Omega_0 t] \end{array} \right\} \quad (3)$$

The above Equation (3) is a complex expression of the electrical synthesized signal, which comprises 2N+1 electrical modulated signal components. As can be known from Equations (2) and (3), the electrical synthesized signal may be used to modulate an optical carrier with an angular frequency of $\Omega_C$ to generate the optical signal. That is, the modulation device and the modulation method according the embodiment of the present invention actually perform IQ modulations of two stages, i.e. an electrical IQ modulation (frequency-shift in an electrical domain) and an optical IQ modulation (frequency-shift in an optical domain). Unlike a conventional technique in which the IQ modulation is performed only once, existence of the imaginary part in Equation (3) is not only for the purpose of facilitating mathematical processing. In fact, since it is necessary to modulate the electrical modulated signals onto the optical carrier again by using the optical IQ modulation, an imaginary-part electrical signal corresponding to the imaginary part in Equation (3) would be sent to a Q input terminal of an optical IQ modulation unit (FIG. 1), and a real-part electrical signal corresponding to the real part in Equation (3) would be sent to an I input terminal of the optical IQ modulation unit. Thus, when the baseband signals are frequency shifted in the electrical domain, it is necessary to generate both the real-part signals and the imaginary-part signals of the electrical modulated signals obtained after the frequency shift, instead of only generating the real-part signals.

The k-th signal component in the electrical synthesized signal shown in Equation (3) is extracted for analysis:

$$I_{Ek}(k\Omega_0 t)+jQ_{Ek}(k\Omega_0 t) = (I_k+jQ_k)\exp[j(k)\Omega_0 t] \quad (4)$$
$$= [I_k\cos(k\Omega_0 t)-Q_k\sin(k\Omega_0 t)]+$$
$$j[I_k\sin(k\Omega_0 t)+Q_k\cos(k\Omega_0 t)]$$

According to Equation (4), the k-th baseband signal $I_k+jQ_k$ may be used to modulate an electrical carrier with an angular frequency of $k\Omega_0$ to obtain a corresponding electrical modulated signal, i.e. the k-th signal component in the electrical synthesized signal shown in Equation (3). When performing the electrical modulation, the real-part signals and the imaginary-part signals of the baseband signals should be processed separately; that is, the real-part signal $I_k$ and imaginary-part signal $Q_k$ are mixed with (multiplied by) electrical carriers, $\cos(k\Omega_0 t)$ and $\sin(k\Omega_0 t)$ respectively, and then are added/subtracted, so as to obtain the respective electrical modulated signal $I_{Ek}+jQ_{Ek}$. Such electrical modulation process is equivalent to frequency-shifting the k-th baseband signal to $K\Omega_0$ in the frequency domain. For this modulation, four mixers (namely, multipliers (the mixing here corresponds to an analog signal processing, i.e. multiplying two analog signals by each other via a multiplier)) corresponding to the four multiplying operations shown in Equation (4) respectively are required.

Hereinafter, a modulation device according to a first embodiment of the present invention will be described with reference to FIG. 1. As described above, it is assumed that a signal source (not shown) generates M baseband signals, where M=2N+1, and N is a non-negative integer. These baseband signals are provided to the modulation device.

As shown in FIG. 1, the modulation device 10 according to the first embodiment of the present invention comprises: M electrical modulation units 100-(−N), . . . , 100-k, . . . , 100-N; a synthesizer 200 including MUXs 200-1 and 200-2; an optical source 300; and an optical modulation unit 400, which may be an IQ modulation unit, for example, an IQ modulation unit formed by a two-arm Mach-Zehnder Interferometer.

The M electrical modulation units 100-(−N), . . . , 100-k, . . . , 100-N modulate electrical carriers with different frequencies using the M baseband signals, respectively, to generate corresponding electrical modulated signals. The electrical carriers may be generated by one or more signal generators (not shown in FIG. 1).

The electrical modulation process is described in detail with reference to FIG. 2. The electrical modulation processes performed by the respective electrical modulation units are substantively the same, thus an electrical modulation unit 100-k (k=0, 1, . . . , ±N) is described here as an example.

Figure 2:
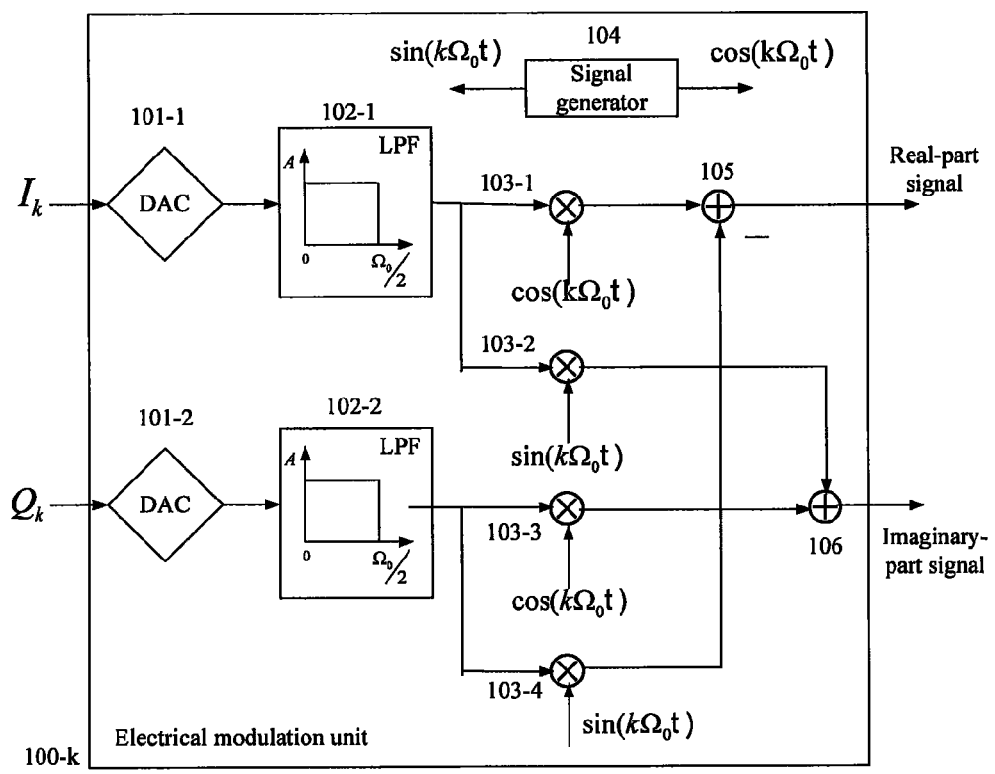
FIG. 2 is a block diagram showing a structure of an electrical modulation unit illustrated in FIG. 1.

FIG. 2 is a block diagram showing a structure of the electrical modulation unit 100-k. As shown in FIG. 2, the electrical modulation unit 100-k comprises Digital-Analog Converters (DACs) 101-1 and 101-2, Low-Pass Filters (LPFs) 102-1 and 102-2, multipliers (mixers) 103-1 to 103-4, a signal generator 104, a subtractor 105 and an adder 106.

A real-part signal $I_k$ and an imaginary-part signal $Q_k$ of a k-th baseband signal $I_k+jQ_k$ input to the electrical modulation unit 100-k are processed separately, as described below.

The real-part signal $I_k$ is input to the DAC 101-1 to be digital-analog converted. Then, the LPF 102-1 performs a low-pass filtering on the analog real-part signal, so as to filter out (remove) high frequency components contained therein. As illustrated in FIG. 2, a passband of the LPF 102-1 may be set to $0-\Omega_0/2$ so as to filter out high frequency components with frequencies above $\Omega_0/2$. The filtered analog real-part signal $I_k$ (it is to be noted that, for convenience of description, $I_k$ is still used to denote the real-part signal subject to the digital-analog conversion and filtering) is input to first terminals of the multipliers 103-1 and 103-2.

The imaginary-part signal $Q_k$ is input to the DAC 101-2 to be digital-analog converted. Then, the LPF 102-2 performs a low-pass filtering on the analog imaginary-part signal so as to filter out (remove) high frequency components contained therein. Likewise, a passband of the LPF 102-2 may be set to $0-\Omega_0/2$ to filter out high frequency components with frequencies above $\Omega_0/2$. The filtered analog imaginary-part signal $Q_k$ (it is to be noted that, for convenience of description, $Q_k$ is still used to denote the imaginary-part signal subject to the digital-analog conversion and filtering) is input to first terminals of the multipliers 103-3 and 103-4.

The signal generator 104 generates a cosine electrical carrier ($\cos k\Omega_0 t$) and a sine electrical carrier ($\sin k\Omega_0 t$, which may be obtained by phase-shifting the cosine electrical carrier by 90°) both having an angular frequency of $k\Omega_0$, outputs the cosine electrical carrier to second terminals of the multipliers 103-1 and 103-3, and outputs the sine electrical carrier to second terminals of the multipliers 103-2 and 103-4. In FIG. 2, connections between the signal generator 104 and the respective multipliers are not shown for clarity.

The multiplier 103-1 multiplies the filtered analog real-part signal $I_k$ by the cosine electrical carrier ($\cos k\Omega_0 t$), and outputs a resultant signal ($I_k \cos k\Omega_0 t$) to the first input terminal of the subtractor 105.

The multiplier 103-2 multiplies the filtered analog real-part signal $I_k$ by the sine electrical carrier ($\sin k\Omega_0 t$), and outputs a resultant signal ($I_k \sin k\Omega_0 t$) to the second input terminal of the adder 106.

The multiplier 103-3 multiplies the filtered analog imaginary-part signal $Q_k$ by the cosine electrical carrier ($\cos k\Omega_0 t$), and outputs a resultant signal ($Q_k \cos k\Omega_0 t$) to the first input terminal of the adder 106.

The multiplier 103-4 multiplies the filtered analog imaginary-part signal $Q_k$ by the sine electrical carrier ($\sin k\Omega_0 t$), and outputs a resultant signal ($Q_k \sin k\Omega_0 t$) to the second input terminal of the subtractor 105.

The subtractor 105 subtracts the signal input to its second input terminal from the signal input to its first input terminal, and provides a signal ($I_k \cos k\Omega_0 t - Q_k \sin k\Omega_0 t$), which is a result of the subtraction, to the synthesizer 200 (specifically, the MUX 200-1, see FIG. 1) as a real-part signal of an electrical modulated signal obtained by electrically modulating the baseband signal $I_k+jQ_k$.

The adder 106 adds the signals input to its first input terminal and its second input terminal, and provides a signal ($I_k \sin k\Omega_0 t + Q_k \cos k\Omega_0 t$), which is a result of the addition, to the synthesizer 200 (specifically, the MUX 200-2, see FIG. 1) as an imaginary-part signal of the electrical modulated signal obtained by electrically modulating the baseband signal $I_k+jQ_k$.

Through the electrical modulation performed by the electrical modulation unit 100-k, the electrical modulated signal, i.e. $I_{Ek}+jQ_{Ek}$, as shown in the above Equation (4), can be obtained.

Figure 3A:
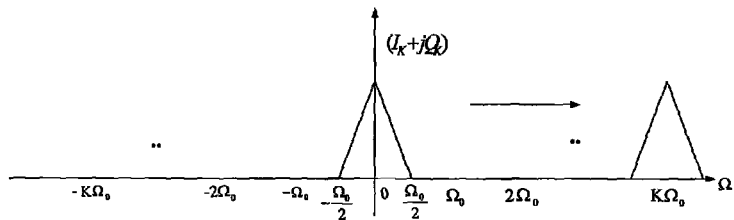
FIGS. 3A-3D shows schematic diagrams of frequency spectrums of signals obtained by performing electrical modulations on baseband signals.
Figure 3B:
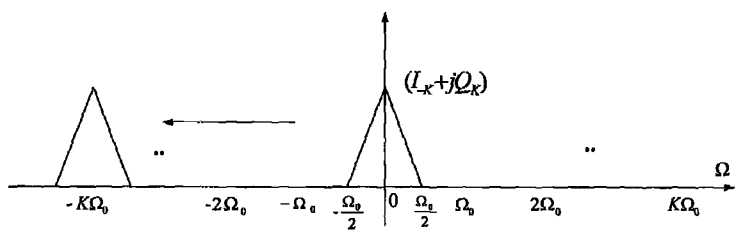

In the same way, the 2N+1 electrical modulation units modulate electrical carriers with different carrier frequencies by using the respective baseband signals, respectively, and generate corresponding electrical modulated signals. This is equivalent to frequency-shifting the respective baseband signals in the frequency domain. For example, given k=+K (K=0, . . . , N), an electrical modulated signal $[I_K \cos(K\Omega_0 t) - Q_K \sin(K\Omega_0 t)] + j[I_K \sin(K\Omega_0 t) + Q_K \cos(K\Omega_0 t)]$ may be obtained by the above modulation process; this is equivalent to shifting the baseband signal $I_K+jQ_K$ to an angular frequency $K\Omega_0$ in the frequency domain, and a schematic diagram of a frequency spectrum for this process is illustrated in FIG. 3A. On the contrary, given k=−K (K=0, . . . , N), an electrical modulated signal $[I_{-K} \cos(-K\Omega_0 t) - Q_{-K} \sin(-K\Omega_0 t)] + j[I_{-K} \sin(-K\Omega_0 t) + Q_{-K} \cos(-K\Omega_0 t)]$, i.e. $[I_{-K} \cos(K\Omega_0 t) + Q_{-K} \sin(K\Omega_0 t)] + j[-I_{-K} \sin(K\Omega_0 t) + Q_{-K} \cos(K\Omega_0 t)]$, may be obtained by the above modulation process; this is equivalent to shifting the baseband signal $I_{-K}+jQ_{-K}$ to an angular frequency $-K\Omega_0$ in the frequency domain, and a schematic diagram of a frequency spectrum for this process is illustrated in FIG. 3B.

Turning back to FIG. 1, the electrical modulation units 100-(−N), 100-k, . . . , 100-N input the respective electrical modulated signals into the synthesizer 200, where the real-part signals of the respective electrical modulated signals are input to the MUX 200-1, and the imaginary-part signals of the respective electrical modulated signals are input to the MUX 200-2.

Figure 3C:
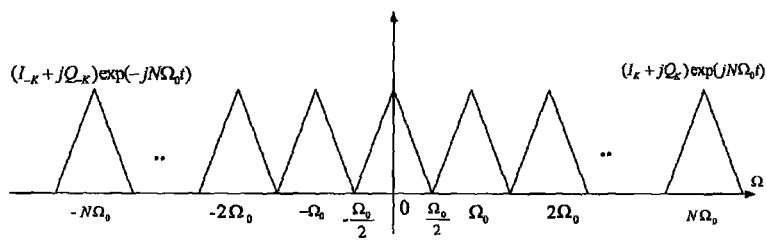

The synthesizer 200 synthesizes the respective electrical modulated signals into a single electrical synthesized signal, a schematic diagram of a frequency spectrum of which is illustrated in FIG. 3C. Specifically, the MUX 200-1 synthesizes the real-part signals of the respective electrical modulated signals as a real-part signal of the electrical synthesized signal. The MUX 200-2 synthesizes the imaginary-part signals of the respective electrical modulated signals as an imaginary-part signal of the electrical synthesized signal. As can be known from FIG. 3C, the electrical modulations performed on the respective baseband signals are actually to modulate the plurality of baseband signals onto the respective electrical carriers in a manner of frequency division multiplexing.

The real-part signal of the electrical synthesized signal is input to an I input terminal of the IQ modulation unit 400. The imaginary-part signal of the electrical synthesized signal is input to a Q input terminal of the IQ modulation unit 400. The optical source 300 is a local oscillating laser, which may generate an optical carrier signal with a carrier frequency of $f_c$ (an angular frequency of $\Omega_c$) and input it to the IQ modulation unit 400.

Figure 3D:
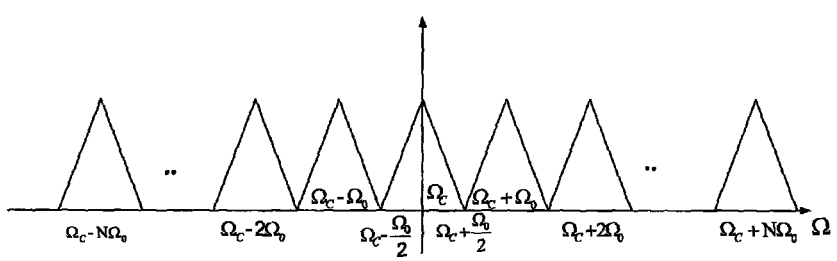

The IQ modulation unit 400 then modulates the optical carrier signal by using the electrical synthesized signal to generate an optical signal. The optical modulation process is equivalent to shifting a frequency of the electrical synthesized signal by an angular frequency of $\Omega_c$ in the frequency domain, and a schematic diagram of a frequency spectrum thereof is illustrated in FIG. 3D. Since the modulation process is well known in the art, a detailed description thereof is omitted here. As shown in FIG. 3D, by this frequency shifting, signal components corresponding to the respective baseband signals in the optical signal are located at both sides, rather than a single side, of the angular frequency, $\Omega_c$, of the optical carrier, and an angular frequency interval between two adjacent signal components is $\Omega_0$.

Finally, the optical signal is transmitted to the receiving side by a transmitting device (not shown) via the optical fiber line.

Hereinafter, a modulation method according to a first embodiment of the present invention is described with reference to FIG. 4. The modulation method may be performed by the modulation device illustrated in FIG. 1.

Figure 4:
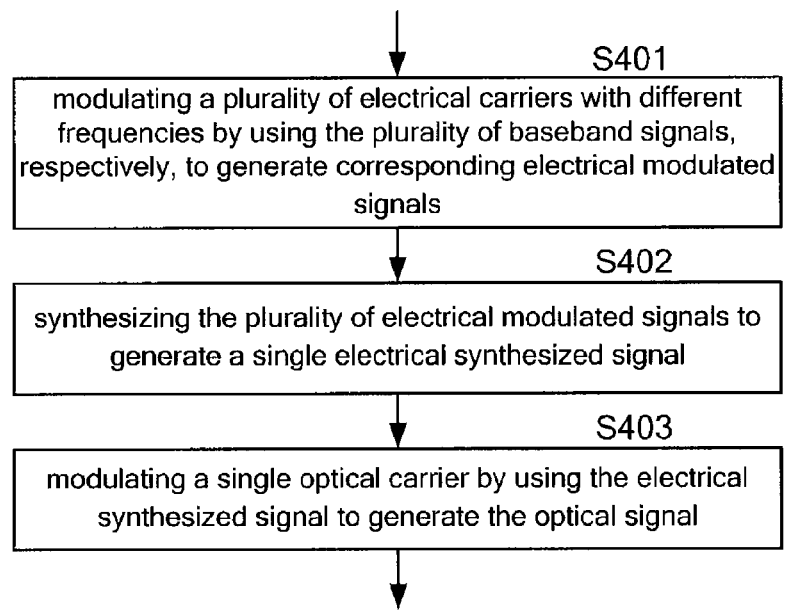
FIG. 4 is a flow chart of a modulation method according to a first embodiment of the present invention.

As shown in FIG. 4, in step S401, electrical carriers with different frequencies are modulated using a plurality of baseband signals, respectively, to generate corresponding electrical modulated signals.

As described above, the M (=2N+1) baseband signals generated by the signal source may be electrically modulated by the electrical modulation unit 100-(-N), ..., 100-k, ..., 100-N illustrated in FIG. 1, where the real-part signal $I_k$ and the imaginary-part signal $Q_k$ of each of the baseband signals $I_k+jQ_k$ (k=0, 1, ..., ±N) are processed separately.

Hereinafter, a method for performing the electrical modulation on the baseband signal $I_k+jQ_k$ is described with reference to FIG. 2.

The real-part signal $I_k$ is digital-analog converted firstly, and then is low-pass filtered to filter out high frequency components in the analog real-part signal. Likewise, the imaginary-part signal $Q_k$ is digital-analog converted firstly, and then is low-pass filtered to filter out high frequency components in the analog imaginary-part signal.

Then, the filtered analog real-part signal $I_k$ is multiplied by a cosine electrical carrier (cos $k\Omega_0 t$) with an angular frequency of $k\Omega_0$ by using the multiplier 103-1, and a resultant signal ($I_k$ cos $k\Omega_0 t$) is output to the first input terminal of the subtractor 105; the filtered analog real-part signal $I_k$ is multiplied by a sine electrical carrier (sin $k\Omega_0 t$) by using the multiplier 103-2, and a resultant signal ($I_k$ sin $k\Omega_0 t$) is output to the second input terminal of the adder 106; the filtered analog imaginary-part signal $Q_k$ is multiplied by the cosine electrical carrier (cos $k\Omega_0 t$) by using the multiplier 103-3, and a resultant signal ($Q_k$ cos $k\Omega_0 t$) is output to the first input terminal of the adder 106; and the filtered analog imaginary-part signal $Q_k$ is multiplied by the sine electrical carrier (sin $k\Omega_0 t$) by using the multiplier 103-4, and a resultant signal ($Q_k$ sin $k\Omega_0 t$) is output to the second input terminal of the subtractor 105.

Subsequently, the subtractor 105 subtracts the signal input to its second input terminal from the signal input to its first input terminal, and outputs a signal ($I_k$ cos $k\Omega_0 t - Q_k$ sin $k\Omega_0 t$), which is a result of the subtraction, as a real-part signal of the electrical modulated signal $I_{Ek}+jQ_{Ek}$ obtained by electrically modulating the baseband signal $I_k+jQ_k$. The adder 106 adds the signal input to its first input terminal and the signal input to its second input terminal, and outputs a signal ($I_k$ sin $k\Omega_0 t + Q_k$ cos $k\Omega_0 t$), which is a result of the addition, as an imaginary-part signal of the electrical modulated signal obtained by electrically modulating the baseband signal $I_k+jQ_k$. Thus, the electrical modulated signal $I_{Ek}+jQ_{Ek}$ is obtained.

In the similar way, the M electrical modulation units modulate the electrical carriers with different carrier frequencies by using the respective baseband signals, respectively, and generate corresponding electrical modulated signals.

Turning back to FIG. 4, in step S402, the plurality of electrical modulated signals are synthesized to generate a single electrical synthesized signal. In particular, the real-part signals of the respective electrical modulated signals may be synthesized as a real-part signal of the electrical synthesized signal, and the imaginary-part signals of the respective electrical modulated signals may be synthesized as an imaginary-part signal of the electrical synthesized signal. The synthesizing process may be performed by the synthesizer 200 illustrated in FIG. 1.

Next, in step S403, a single optical carrier is modulated by using the electrical synthesized signal to generate an optical signal. The optical signal may be generated in the manner described above by the IQ modulation unit 400 which modulates the optical carrier signal with a carrier frequency of $f_c$ (an angular frequency of $\Omega_c$) using the electrical synthesized signal. This modulation process is well known in the art, and thus a detailed description thereof is omitted here. As described above, with the optical modulation, signal components corresponding to the respective baseband signals in the optical signal are distributed on both sides of the carrier frequency of the optical carrier at a predetermined frequency interval, and preferably are distributed symmetrically on both sides of the carrier frequency. The optical signal may be transmitted to the receiving side via the optical fiber line.

It can be seen that, at the transmitting side, M baseband signals are modulated onto M electrical carries having different frequencies to realize frequency division multiplexing, therefore the sampling rate of the DAC at the transmitting side may be decreased to 1/M of a sampling rate at the time of using only one electrical carrier, and thus the requirement on the sampling rate of the DAC is reduced.

Receiving Side

Figure 5:
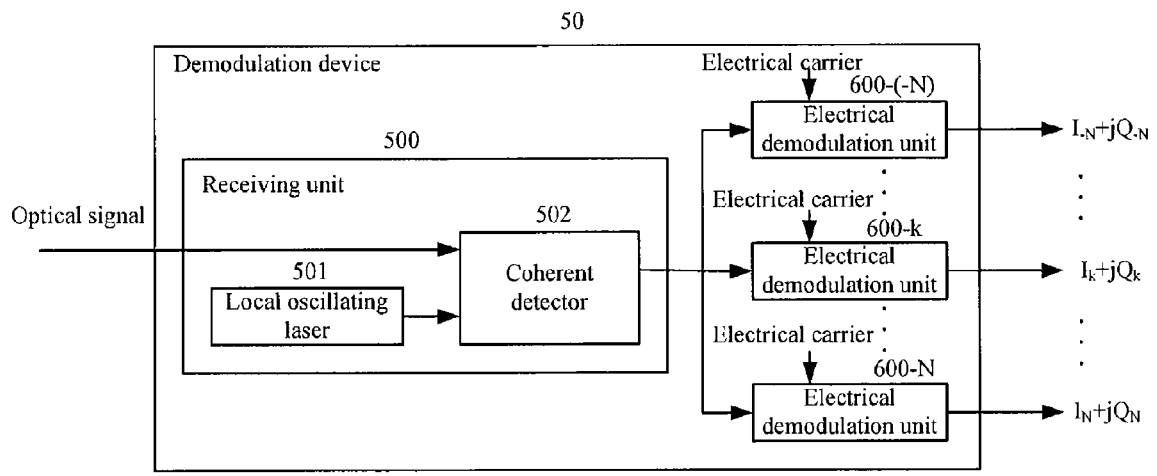
FIG. 5 is a block diagram showing a demodulation device according to a first embodiment of the present invention.

Hereinafter, a demodulation device and a demodulation method according to a first embodiment of the present invention will be described. FIG. 5 shows a block diagram of the demodulation device according to the first embodiment of the present invention.

As shown in FIG. 5, the demodulation device 50 comprises a receiving unit 500 and a plurality of electrical demodulation units 600-(-N), ..., 600-k, ... 600-N. The receiving unit 500 demodulates an optical signal (i.e., an optical signal generated in the manner described above) received from outside via an optical fiber line (not shown) into a single electrical signal by using a single optical carrier (local oscillating light), where a carrier frequency (local oscillating frequency) of the optical carrier is selected such that respective signal components, which correspond to a plurality of baseband signals respectively, in the optical signal are distributed on both sides of the carrier frequency at a predetermined frequency interval. Then, the plurality of electrical demodulation units demodulate the electrical signal by using a plurality of electrical carries (local oscillating electrical carriers) with different frequencies (local oscillating frequencies), respectively, so as to generate the plurality of baseband signals.

Specifically, the receiving unit 500 performs a coherent reception on the optical signal to demodulate it into the electrical signal. Therefore, the receiving unit 500 functions as an optical demodulation unit, which comprises a local oscillating laser 501 and a coherent detector 502.

Figure 6:
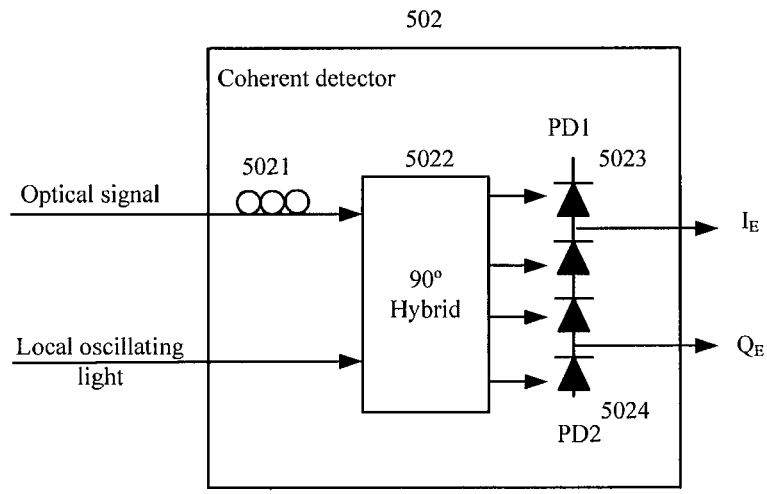
FIG. 6 is a block diagram showing a structure of a coherent detector illustrated in FIG. 5.

The local oscillating laser 503 may generate a local oscillating light (optical carrier) with a local oscillating frequency of $\Omega_c$, and outputs it to the coherent detector 502. The coherent detector 502 performs a coherent detection on the optical signal by using the local oscillating light, and generates the single electrical signal. FIG. 6 shows an exemplary structure of the coherent detector 502. As shown in FIG. 6, the coherent detector 502 comprises a polarization controller 5021, a 90°-hybrid 5022 and balanced receivers 5023 and 5024. The optical signal input to the receiving unit 500 is input to the 90°-hybrid 5022 after passing through the polarization controller 5021. The optical signal and the local oscillating light are mixed in the 90° hybrid 5022, and are output to the balanced receivers 504 and 505 in, for example, 4 paths, so as to be converted into the electrical signal. The method for the coherent detector 502 to perform the coherent detection on the optical signal so as to generate the electrical signal is well known in the art, and thus a detailed description thereof is omitted here.

The generated electrical signal comprises two parts, i.e. a real-part signal and an imaginary-part signal, and the electrical signal may be expressed in the expression manner described above as follows:

$$I_E + jQ_E = \begin{Bmatrix} (I_{-N} + jQ_{-N})\exp[j*(-N)\Omega_0 t] + \ldots + (I_k + jQ_k)\exp[j*(k)\Omega_0 t] + \ldots + \\ (I_N + jQ_N)\exp[j*(N)\Omega_0 t] \end{Bmatrix} \quad (5)$$

As can be known from Equation (5), the electrical signal comprises a plurality of electrical modulated signal components $(I_k+jQ_k)\exp[j*(k)\Omega_0 t]$ ($k=0, 1, \ldots, \pm N$). In order to obtain the baseband signals $I_k+jQ_k$ corresponding to the respective electrical modulated signal components, mathematically, Equation (5) may be multiplied by $\exp[-j*(k)\Omega_0 t]$, then respective terms corresponding to high frequency components are deleted from a result of the multiplication (which is equivalent to filtering out (removing) the respective high frequency components by a low-pass filter).

Physically, the plurality of electrical demodulation units 600-(-N), ..., 600-k, ..., 600-N demodulate the electrical signal by using a plurality of electrical carriers (local oscillating electrical carriers) with different carrier frequencies (local oscillating frequencies), respectively, so as to generate the plurality of baseband signals. This demodulation process will be described with reference to FIG. 7. Since the electrical demodulation processes performed by the respective electrical demodulation units are substantive the same, the electrical demodulation unit 600-k is described here as an example.

Figure 7:
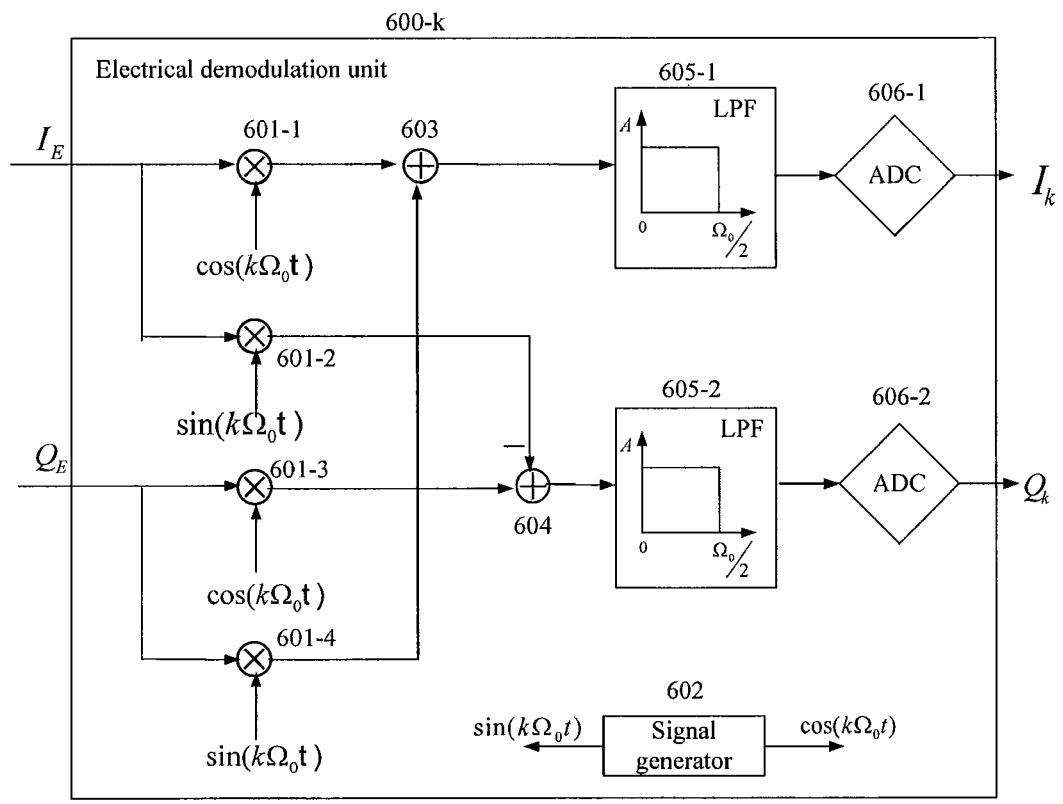
FIG. 7 is a block diagram showing a structure of an electrical demodulation unit illustrated in FIG. 5.

FIG. 7 is a block diagram showing a structure of the electrical demodulation unit 600-k. As shown in FIG. 7, the electrical demodulation unit 600-k comprises multipliers (mixers) 601-1 to 601-4, a signal generator 602, an adder 603, a subtractor 604, LPFs 605-1 and 605-2, and ADCs 606-1 and 606-2.

The real-part signal $I_E$ and the imaginary-part signal $Q_E$ of the electrical signal $I_E+jQ_E$ provided from the receiving unit 500 are processed separately. The real-part signal $I_E$ is input to first input terminals of the multipliers 601-1 and 601-2. The imaginary-pad signal $Q_E$ is input to first input terminals of the multipliers 601-3 and 601-4.

The signal generator 602 generates a cosine electrical carrier (cos $k\Omega_0 t$) and a sine electrical carrier (sin $k\Omega_0 t$) both having an angular frequency of $k\Omega_0$, outputs the cosine electrical carrier to second input terminals of the multipliers 601-1 and 601-3, and outputs the sine electrical carrier to second input terminals of the multipliers 601-2 and 601-4. In FIG. 7, connections between the signal generator 602 and the respective multipliers are not shown for clarity.

The multiplier 601-1 multiplies the real-part signal $I_E$ by the cosine electrical carrier (cos $k\Omega_0 t$), and outputs a resultant signal ($I_E$ cos $k\Omega_0 t$) to the first input terminal of the adder 603.

The multiplier 601-2 multiplies the real-pad signal $I_E$ by the sine electrical carrier (sin $k\Omega_0 t$), and outputs a resultant signal ($I_E$ sin $k\Omega_0 t$) to the second input terminal of the subtractor 604.

The multiplier 601-3 multiplies the imaginary-pad signal $Q_E$ by the cosine electrical carrier (cos $k\Omega_0 t$), and outputs a resultant signal ($Q_E$ cos $k\Omega_0 t$) to the first input terminal of the subtractor 604.

The multiplier 601-4 multiplies the imaginary-part signal $Q_E$ by the sine electrical carrier (sin $k\Omega_0 t$), and outputs a resultant signal ($Q_E$ sin $k\Omega_0 t$) to the second input terminal of the adder 603.

The adder 603 adds the signal input to its first input terminal and the signal input to its second input terminal, and outputs a resultant sum signal ($I_E$ cos $k\Omega_0 t + Q_E$ sin $k\Omega_0 t$) to the LPF 605-1. The LPF 605-1 has a passband of $0-\Omega_0/2$, and performs a low-pass filtering on the sum signal to filter out high frequency components therein. Next, the ADC 606-1 performs an analog-digital conversion on the filtered sum signal, and outputs the analog-digital converted sum signal as a real-part signal $I_k$ of the baseband signal finally obtained.

The subtractor 604 subtracts the signal input to its second input terminal from the signal input to its first input terminal, and outputs a resultant difference signal ($Q_E$ cos $k\Omega_0 t - I_E$ sin $k\Omega_0 t$) to the LPF 605-2. The LPF 605-2 has a passband of $0-\Omega_0/2$, and performs a low-pass filtering on the difference signal to filter out high frequency components therein. Next, the ADC 606-2 performs an analog-digital conversion on the filtered difference signal, and outputs the analog-digital converted difference signal $Q_k$ as an imaginary-part signal $Q_k$ of the baseband signal finally obtained.

Thus, the baseband signal $I_k+jQ_k$ is obtained by the electrical demodulation performed by the demodulation unit 600-k. Similarly, the respective electrical demodulation units 600-(-N), ..., 600-k, ... 600-N demodulate the electrical signal $I_E+jQ_E$ by using the plurality of electrical carriers with respective different carrier frequencies, respectively, and thereby obtain the plurality of baseband signals.

Hereinafter, the demodulation method according to the first embodiment of the present invention will be described with reference to FIG. 8.

Figure 8:
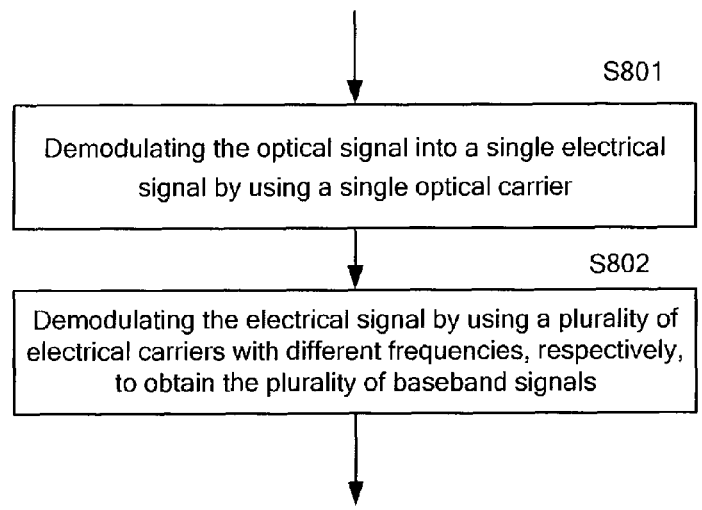
FIG. 8 is a flow chart showing a demodulation method according to a first embodiment of the present invention.

As shown in FIG. 8, in step S801, an optical signal received from outside via the optical fiber line is demodulated into a single electrical signal by using a single optical carrier. As described above, a carrier frequency of the optical carrier is selected such that respective signal components, which correspond to a plurality of baseband signals, in the optical signal are distributed on both sides of the carrier frequency of the optical carrier at a predetermined frequency interval.

In particular, the receiving unit 500 illustrated in FIG. 5 may be used to perform the optical demodulation. The coherent detector 502 performs a coherent detection on the optical signal by using a local oscillating light (optical carrier) with a local oscillating frequency of $\Omega_c$ generated by the local oscillating laser 503, and generates the electrical signal, as shown in Equation (5). A specific method for performing this coherent detection is well known in the art, thus a detailed description thereof is omitted here.

Next, in step S802, the electrical signal is demodulated by using a plurality of electrical carriers with different frequencies, respectively, so as to generate the plurality of baseband signals. The electrical demodulation units 600-(-N), ..., 600-k, ... 600-N shown in FIG. 5 may be used to perform the electrical demodulation.

A process for demodulating the electrical signal $I_E+jQ_E$ to obtain the baseband signal $I_k+jQ_k$ will be described with reference to FIG. 7. During the demodulation, a real-part signal $I_E$ and an imaginary-part signal $Q_E$ of the electrical signal $I_E+jQ_E$ will be processed separately.

In particular, the real-part signal $I_E$ is multiplied by a cosine electrical carrier (cos $k\Omega_0 t$) generated by the signal generator 602 through the multiplier 601-1, so that a signal ($I_E \cos k\Omega_0 t$) is obtained. The real-part signal $I_E$ is multiplied by a sine electrical carrier ($\sin k\Omega_0 t$) generated by the signal generator 602 through the multiplier 601-2, so that a signal ($I_E \sin k\Omega_0 t$) is obtained. The imaginary-part signal $Q_E$ is multiplied by the cosine electrical carrier ($\cos k\Omega_0 t$) through the multiplier 601-3, so that and a signal ($Q_E \cos k\Omega_0 t$)) is obtained. The imaginary part signal $Q_E$ is multiplied by the sine electrical carrier ($\sin k\Omega_0 t$) through the multiplier 601-4, so that a signal ($Q_E \sin k\Omega_0 t$) is obtained.

Then, the signal ($I_E \cos k\Omega_0 t$) and the signal ($Q_E \sin k\Omega_0 t$) are added by the adder 603, so that a sum signal ($I_E \cos k\Omega_0 t + Q_k \sin k\Omega_0 t$) is obtained. The signal ($I_E \sin k\Omega_0 t$) is subtracted from the signal ($Q_E \cos k\Omega_0 t$) by the subtractor 604, so that a difference signal ($Q_E \cos k\Omega_0 t - I_E \sin k\Omega_0 t$) is obtained.

Next, the LPF 605-1 performs a low-pass filtering on the sum signal to filter out high frequency components therein. The filtered sum signal is then analog-digital converted by the ADC 606-1, and the analog-digital converted sum signal is outputted as a real-part signal $I_k$ of the baseband signal finally obtained. Additionally, the LPF 605-2 performs a low-pass filtering on the difference signal to filter out high frequency components therein. The filtered difference signal is then analog-digital converted by the ADC 606-2, and the analog-digital converted difference signal $Q_k$ is outputted as an imaginary-part signal $Q_k$ of the baseband signal finally obtained.

Thus, the baseband signal $I_k + jQ_k$ is obtained by performing the demodulation on the electrical signal using the electrical carrier having the angular frequency of $k\Omega_0$. Similarly, the plurality of baseband signals may be obtained by demodulating the electrical signal $I_E + jQ_E$ using the plurality of electrical carriers having respective different carrier frequencies, respectively.

In the demodulation device and the demodulation method according to the first embodiment of the present invention, M baseband signals carrying data to be transmitted are modulated onto M electrical carriers at the transmitting side to realize frequency division multiplexing, therefore at the receiving side it is possible to use M ADCs to perform analog-digital conversion on M signals obtained by electrical demodulations, thus sampling rates of the ADCs may be decreased to 1/M of the sampling rate when only one electrical carrier is used, that is, the requirement on the sampling rate of each of the ADCs may be reduced.

It is to be noted that, although the first embodiment of the present invention is described above with respect to the case of M=2N+1, the present invention is applicable to a case of M=2N (N is a natural number), in which case we may let k=1, ..., ±N, and the other contents may remain substantially unchanged.

Second Embodiment

Transmitting Side

It can found by observing the electrical synthesized signal expressed in Equation (3) that a term corresponding to the baseband signal $I_N + jQ_N$ and a term corresponding to the baseband signal $L_{-N} + jQ_{-N}$ may be merged. In general, a term corresponding to the baseband signal $I_K + jQ_K$ and a term corresponding to the baseband signal $L_{-K} + jQ_{-K}$ may be merged, where K=1, ..., N. The two baseband signals correspond to two electrical modulated signals respectively having a positive frequency and a negative frequency which are symmetrical about an origin in the frequency domain, as shown in FIG. 3C, and correspond to two signal components, which are symmetrical about the carrier frequency of the optical carrier on the frequency axis, in the finally obtained optical signal, as shown in FIG. 3D.

Based on this, Equation (3) can be rewritten. Here, for the sake of simplicity, a term corresponding to the baseband signal which is frequency-shifted to $-K\Omega_0$ and a term corresponding to the baseband signal which is frequency-shifted to $K\Omega_0$ in Equation (3) are extracted for description. The two terms are merged, and the following result may be obtained:

$$\{(I_{-K} + jQ_{-K})\exp[j(-K)\Omega_0 t] + (I_K + jQ_K)\exp[j(K)\Omega_0 t]\} = \quad (6)$$
$$[(I_{-K} + I_K)\cos(K\Omega_0 t) + (Q_{-K} - Q_K)\sin(K\Omega_0 t)] +$$
$$j * [(-I_{-K} + I_K)\sin(K\Omega_0 t) + (Q_{-K} + Q_K)\cos(K\Omega_0 t)]$$

In a similar way, remaining terms in Equation (3) are merged two by two, thus Equation (3) is rewritten as an expression where two symmetrical electrical modulated signals having positive and negative frequencies respectively are combined two by two.

It can be known from Equation (6) that, the two symmetrical electrical modulated signals having positive and negative frequencies (that is, two independent positive and negative sideband signals in the electrical synthesized signal) may be obtained by adding, subtracting and combining real-part signals and imaginary-part signals, $L_{-K}$, $I_K$, $Q_{-K}$, $Q_K$, of two baseband signals corresponding to the two electrical modulated signals to obtain four component signals of a combined baseband signal, ($L_{-K} + I_K$), ($Q_{-K} - Q_K$), ($-I_{-K} + I_K$) and ($Q_{-K} + Q_K$), and then mixing the four component signals with (i.e. multiplying them by) the cosine electrical carrier ($\cos k\Omega_0 t$) and the sine electrical carrier ($\sin k\Omega_0 t$), respectively. Then, in a subsequent optical modulation, the two electrical modulated signals are modulated to symmetrical positions on two sides of the carrier frequency of the optical carrier, respectively. In other words, when the plurality of electrical carriers are modulated using the plurality of baseband signals, respectively, two baseband signals corresponding to two signal components which are symmetrical about the carrier frequency of the optical carrier on the frequency axis may be electrically modulated simultaneously. This is accomplished by combining the two baseband signals and modulating a corresponding electrical carrier with the combined signal.

Based on the above principle, a modulation device and a modulation method according to a second embodiment of the present invention are proposed.

Figure 9:
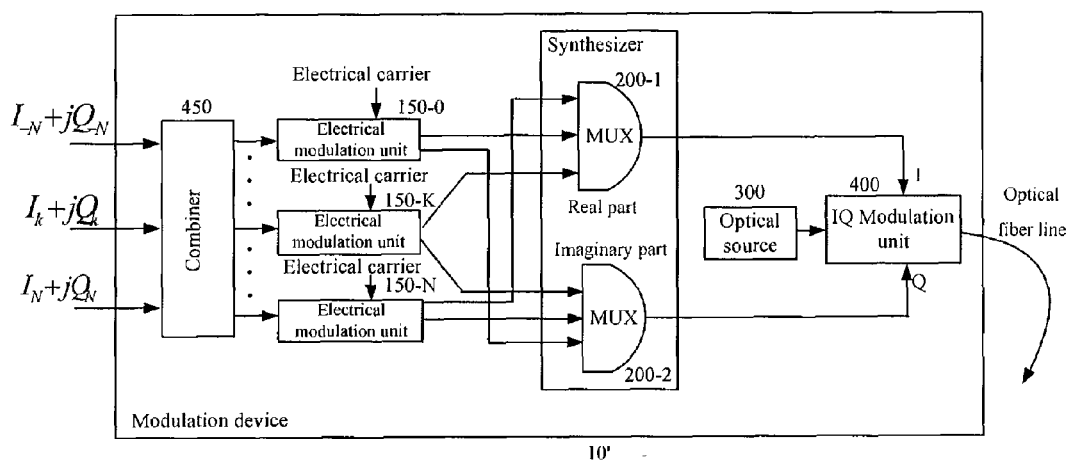
FIG. 9 is a block diagram of a modulation device according to a second embodiment of the present invention.

FIG. 9 shows a block diagram of the modulation device according to the second embodiment of the present invention. The modulation device 10' is substantively the same as the modulation device 10 illustrated in FIG. 1, except for a combiner 450 and electrical modulation units 150-0 to 150-N. Descriptions of the same parts are omitted here for simplicity.

Referring to FIG. 9, M (=2N+1) baseband signals $I_{-N} + jQ_{-N}, \ldots, I_k + jQ_k, \ldots, I_N + jQ_N$ input to the modulation device 10' enter into the combiner 450. The combiner 450 combines baseband signals $L_{-K} + jQ_{-K}$ and $I_K + jQ_K$ (K=1, ..., N) two by two in the manner described with reference to Equation (6), so as to generate N+1 combined baseband signals, and each of the combined baseband signals may have four component signals, ($I_{-K} + I_K$), ($Q_{-K} - Q_K$), ($-I_{-K} + I_K$) and ($Q_{-K} + Q_K$). It is to be noted that, although not combined, the baseband signal with K=0 is also called a combined baseband signal for convenience of description). Then, N+1 electrical modulation units 150-0 to 150-N modulate N+1 electrical carriers (local oscillating electrical carriers) with different frequencies by using the N+1 combined baseband signals, respectively, in order to obtain corresponding electrical modulated signals. For example, the combiner 450 may comprises adders and subtractor (not shown) for performing addition/subtraction operations on real-part signals and imaginary-part signals of the two baseband signals so as to obtain the four component signals.

Figure 10:
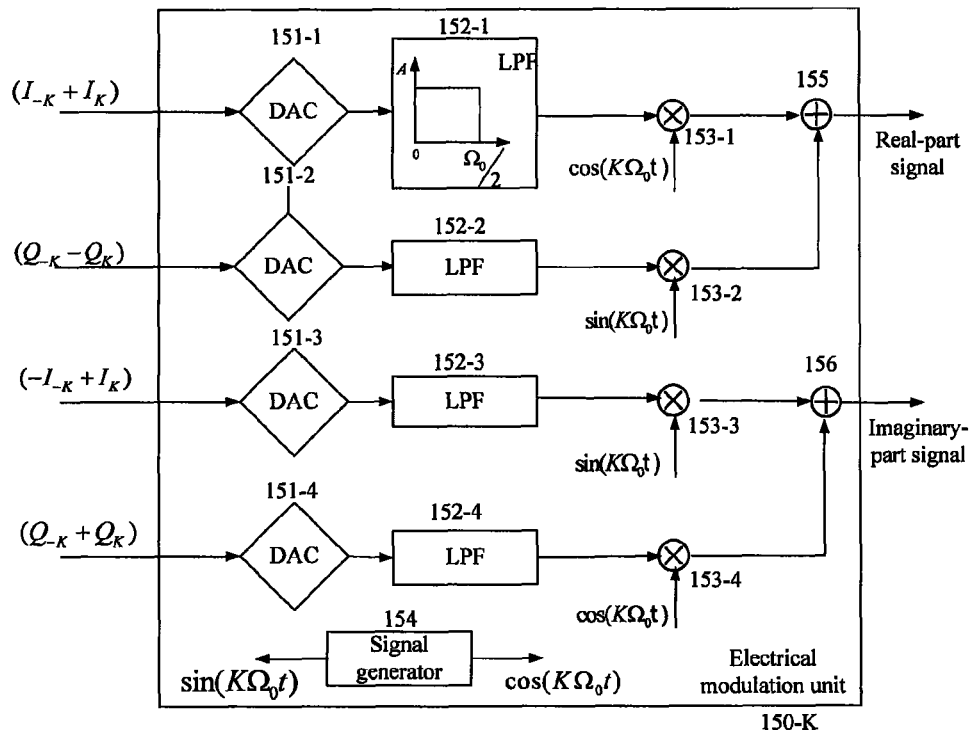
FIG. 10 is a block diagram showing a structure of an electrical modulation unit illustrated in FIG. 9.

Hereinafter, the electrical modulation processes performed by the electrical modulation units on the combined baseband signals will be described with reference to FIG. 10. Since the processes performed by the respective electrical modulation units are substantially the same, an electrical modulation unit 150-K is described here as an example.

The electrical modulation unit 150-K comprises DACs 151-1 to 151-4, LPFs 152-1 to 152-4 with a passband of $0-\Omega_0/2$, multipliers 153-1 to 153-4 and adders 155 and 156.

A combined baseband signal with four component signals $(I_{-K}+I_K)$, $(Q_{-K}-Q_K)$, $(-I_{-K}+I_K)$, and $(Q_{-K}+Q_K)$ is input to the electrical modulation unit 150-K.

The component signal $(I_{-K}+I_K)$ is input to the DAC 151-1 to be digital-analog converted, and then is input to the LPF 152-1 to filter out high frequency components included therein. The filtered analog component signal $(I_{-K}+I_K)$ is input to a first input terminal of the multiplier 153-1.

The component signal $(Q_{-K}-Q_K)$ is input to the DAC 151-2 to be digital-analog converted, and then is input to the LPF 152-2 to filter out high frequency components included therein. The filtered analog component signal $(Q_{-K}-Q_K)$ is input to a first input terminal of the multiplier 153-2.

The component signal $(-I_{-K}+I_K)$ is input to the DAC 151-3 to be digital-analog converted, and then is input to the LPF 152-3 to filter out high frequency components included therein. The filtered analog component signal $(-I_{-K}+I_K)$ is input to a first input terminal of the multiplier 153-3.

The component signal $(Q_{-K}+Q_K)$ is input to the DAC 151-4 to be digital-analog converted, and then is input to the LPF 152-4 to filter out high frequency components included therein. The filtered analog component signal $(Q_{-K}+Q_K)$ is input to a first input terminal of the multiplier 153-4.

A signal generator 154 generates a cosine electrical carrier $(\cos K\Omega_0 t)$ and a sine electrical carrier $(\sin K\Omega_0 t)$ both having an angular frequency of $K\Omega_0$, outputs the cosine electrical carrier to second input terminals of the multipliers 153-1 and 153-4, and outputs the sine electrical carrier to second input terminals of the multipliers 153-2 and 153-3. In FIG. 10, connections between the signal generator 154 and the respective multipliers are not shown for clarity.

The multiplier 153-1 multiplies the filtered analog component signal $(I_{-K}+I_K)$ by the cosine electrical carrier $(\cos K\Omega_0 t)$, and outputs a resultant signal $((I_{-K}+I_K)\cos K\Omega_0 t)$ to a first input terminal of the adder 155.

The multiplier 153-2 multiplies the filtered analog component signal $(Q_{-K}-Q_K)$ by the sine electrical carrier $(\sin K\Omega_0 t)$, and outputs a resultant signal $((Q_{-K}-Q_K)\sin K\Omega_0 t)$ to a second input terminal of the adder 155.

The multiplier 153-3 multiplies the filtered analog component signal $(-I_{-K}+I_K)$ by the cosine electrical carrier $(\cos K\Omega_0 t)$, and outputs a resultant signal $((-I_{-K}+I_K)\cos K\Omega_0 t)$ to a first input terminal of the adder 156.

The multiplier 153-4 multiplies the filtered analog component signal $(Q_{-K}+Q_K)$ by the sine electrical carrier $(\sin K\Omega_0 t)$, and outputs a resultant signal $((Q_{-K}+Q_K)\sin K\Omega_0 t)$ to a second input terminal of the adder 156.

The adder 155 adds the signal input to its first input terminal and the signal input to its second input terminal, and outputs a signal $((I_{-K}+I_K)\cos K\Omega_0 t+(Q_{-K}-Q_K)\sin K\Omega_0 t)$, which is a result of the addition, to the synthesizer 200 as a real-part signal of the electrical modulated signal obtained by electrically modulating the combined baseband signal.

The adder 156 adds the signal input to its first input terminal and the signal input to its second input terminal, and outputs a signal $((-I_{-K}+I_K)\sin K\Omega_0 t+(Q_{-K}+Q_K)\cos K\Omega_0 t)$, which is a result of the addition, to the synthesizer 200, as an imaginary-part signal of the electrical modulated signal obtained by electrically modulating the combined baseband signal.

In a similar way, the N+1 electrical modulation units modulate the electrical carriers with different carrier frequencies by using the respective combined baseband signals, respectively, to generate the respective electrical modulated signals, and provide real-part signals and imaginary-part signals of the electrical modulated signals to a synthesizer 200, respectively.

Then, the synthesizer 200 synthesizes the respective electrical modulated signals into a single electrical synthesized signal in the manner described above, so as to realize frequency division multiplexing of the respective baseband signals. A schematic diagram of a frequency spectrum of the electrical synthesized signal is also shown in FIG. 3C.

Next, an IQ modulation unit 400 modulates an optical carrier signal (local oscillating light) with an angular frequency of $\Omega_C$, which is generated by an optical source 300, by using the electrical synthesized signal, in order to generate an optical signal, as shown in FIG. 3D. The optical signal is transmitted to a receiving side via an optical fiber line.

Figure 11:
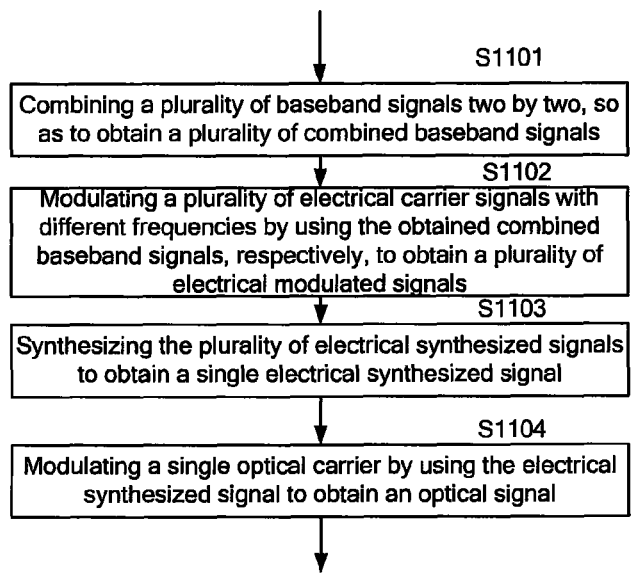
FIG. 11 is a flow chart of a modulation method according to a second embodiment of the present invention.

The modulating method according to the second embodiment of the present invention will be described below. FIG. 11 shows a flow chart of the modulating method according to the second embodiment of the present invention.

In step S1101, a plurality of baseband signals are combined two by two to obtain a plurality of combined baseband signals. In particular, two baseband signals, which correspond to two signal components in the optical signal that are symmetrical about the carrier frequency of the optical carrier on the frequency axis, are combined into a combined baseband signal. For example, the baseband signals $I_{-K}+jQ_{-K}$ and $I_K+jQ_K$ (K=1, . . . , N) may be combined two by two in the manner described above to generate the combined baseband signals with four component signals $(I_{-K}+I_K)$, $(Q_{-K}-Q_K)$, $(-I_{-K}+I_K)$ and $(Q_{-K}+Q_K)$.

Next, in step S1102, a plurality of electrical carriers with different carrier frequencies are modulated by using the obtained combined baseband signals to obtain a plurality of electrical modulated signals.

During the modulation process, the four component signals of each of the combined baseband signals are processed separately. The respective combined baseband signals may be electrically modulated in the manner described above with reference to FIG. 10, so as to obtain the electrical modulated signals, so a detailed description of the modulation process is omitted here.

Subsequently, the plurality of the electrical modulated signals are synthesized into a single electrical synthesized signal in step S1103, and an optical carrier signal with an angular frequency of $\Omega_C$ is modulated by using the electrical synthesized signal to generate an optical signal in step S1104. The optical signal is transmitted to the receiving side via the optical fiber line. Steps S1103 and S1104 are the same as steps S402 and S403 illustrated in FIG. 4, so a detailed description thereof is omitted here.

It can be seen that, in the second embodiment of the present invention, the baseband signals corresponding to two electrical carriers having positive and negative frequencies which are symmetrical about the origin in the frequency domain are combined and then the combined signal is electrically modulated, which, as compared with the modulation device according to the first embodiment, reduces the number of the mixers by a half without changing the numbers of the combiners and the DACs, and thus reduces the cost of the modulation device. Further, no analog subtractors are required in the second embodiment, which may decrease the complexity of the device.

Receiving Side

Hereinafter, a demodulation device and a demodulation method according to a second embodiment of the present invention will be described.

Figure 12:
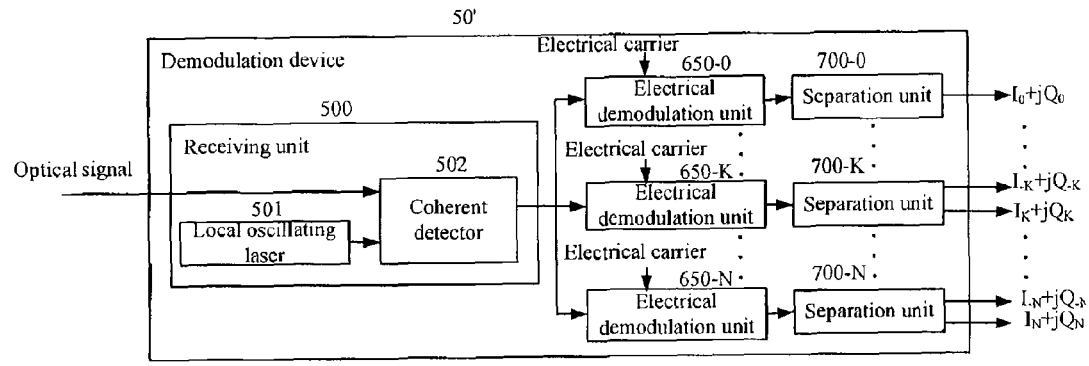
FIG. 12 is a block diagram showing a demodulation device according to a second embodiment of the present invention.

FIG. 12 shows the demodulation device according to the second embodiment of the present invention. The demodulation device 50' is substantively the same as the demodulation device illustrated in FIG. 5, except for electrical demodulation units 650-0 to 650-N and separation units 700-0 to 700-N. Detailed descriptions of the same parts are omitted here for simplicity.

An optical signal input to the demodulation device 50' is demodulated into an electrical signal by the receiving unit 500 in the manner described above, and the electrical signal may be expressed by Equation (3). The electrical signal is input to the electrical demodulation units 650-0 to 650-N, respectively.

The electrical demodulation units 650-0 to 650-N demodulate the electrical signal by using a plurality of electrical carriers with different carrier frequencies, respectively, so as to generate N+1 baseband signals (which are combined baseband signals in fact).

The electrical demodulation processes performed by the electrical demodulation units are described with reference to FIG. 13. Since the electrical demodulation processes performed by the respective electrical demodulation units are substantially the same, an electrical demodulation unit 650-K is described here as an example.

Figure 13:
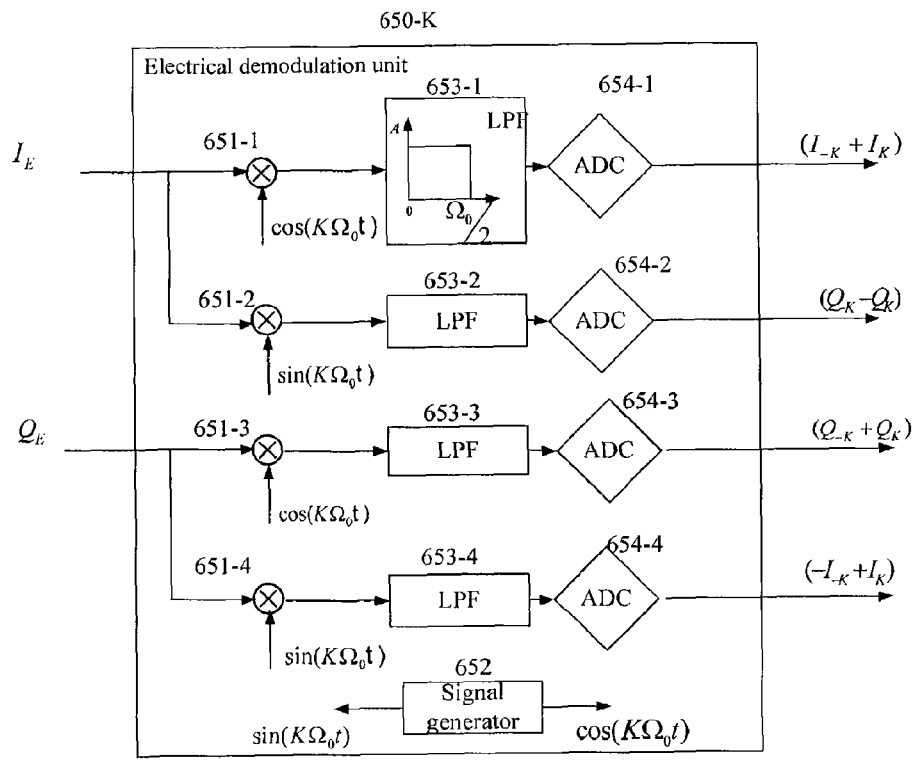
FIG. 13 is a block diagram showing a structure of an electrical demodulation unit illustrated in FIG. 12.

FIG. 13 is a block diagram showing a structure of the electrical demodulation unit 650-K. As shown in FIG. 13, the electrical demodulation unit 650-K comprises multipliers (mixers) 651-1 to 651-4, a signal generator 652, LPFs 653-1 to 653-4 with a passband of $0-\Omega_0/2$, and ADCs 654-1 and 654-4.

A real-part signal $I_E$ and an imaginary-part signal $Q_E$ of the electrical signal $I_E+jQ_E$ provided from the receiving unit 500 to the electrical demodulation unit 650-K are processed separately. The real-part signal $I_E$ is input to first input terminals of the multipliers 651-1 and 651-2. The imaginary-part signal $Q_E$ is input to first input terminals of the multipliers 651-3 and 651-4.

The signal generator 652 generates a cosine electrical carrier ($\cos K\Omega_0 t$) and a sine electrical carrier ($\sin K\Omega_0 t$) both having an angular frequency of $K\Omega_0$, outputs the cosine electrical carrier to second input terminals of the multipliers 651-1 and 651-3, and outputs the sine electrical carrier to second input terminals of the multipliers 651-2 and 651-4. In FIG. 13, connections between the signal generator 652 and the respective multipliers are not shown for clarity.

The multiplier 651-1 multiplies the real-part signal $I_E$ by the cosine electrical carrier ($\cos K\Omega_0 t$), and outputs a resultant signal ($I_E \cos K\Omega_0 t$) to the LPF 653-1.

The multiplier 651-2 multiplies the real-part signal $I_E$ by the sine electrical carrier ($\sin K\Omega_0 t$), and outputs a resultant signal ($I_E \sin K\Omega_0 t$) to the LPF 653-2.

The multiplier 651-3 multiplies the imaginary-part signal $Q_E$ by the cosine electrical carrier ($\cos K\Omega_0 t$), and outputs a resultant signal ($Q_E \cos K\Omega_0 t$) to the LPF 653-3.

The multiplier 651-4 multiplies the imaginary-part signal $Q_E$ by the sine electrical carrier ($\sin K\Omega_0 t$), and outputs a resultant signal ($Q_E \sin K\Omega_0 t$) to the LPF 653-4.

The LPF 653-1 performs a low-pass filtering on the signal ($I_E \cos K\Omega_0 t$) to filter out high frequency components therein. Then, the ADC 654-1 performs an analog-digital conversion on the filtered signal and the obtained signal corresponds to the component ($I_{-K}+I_K$) of the combined baseband signal.

The LPF 653-2 performs a low-pass filtering on the signal ($I_E \sin K\Omega_0 t$) to filter out high frequency components therein. The ADC 654-2 performs an analog-digital conversion on the filtered signal and the obtained signal corresponds to the component ($Q_{-K}-Q_K$) of the combined baseband signal.

The LPF 653-3 performs a low-pass filtering on the signal ($Q_E \cos K\Omega_0 t$) to filter out high frequency components therein. The ADC 654-3 performs an analog-digital conversion on the filtered signal and the obtained signal corresponds to the component ($Q_{-K}+Q_K$) of the combined baseband signal.

The LPF 653-4 performs a low-pass filtering on the signal ($Q_E \sin K\Omega_0 t$) to filter out high frequency components therein. The ADC 654-4 performs an analog-digital conversion on the filtered signal and the obtained signal corresponds to the component ($-I_{-K}+I_K$) of the combined baseband signal.

Hence, the electrical signal $I_E+jQ_E$ is demodulated into the combined baseband signal by using the electrical carrier having the carrier frequency of $k\Omega_0$.

Similarly, the respective electrical demodulation units 650-0, ..., 650-K, ... 650-N demodulate the electrical signal $I_E+jQ_E$ by using the plurality of electrical carriers with respective different carrier frequencies, respectively, and thereby obtain the plurality of combined baseband signals.

The separation units 700-0 to 700-N separate the plurality of the combined baseband signals into two baseband signals, respectively. For example, the separation unit 700-K separates the combined baseband signal comprising four component signals ($I_{-K}+I_K$), ($Q_{-K}-Q_K$), ($-I_{-K}+I_K$), and ($Q_{-K}+Q_K$) into two baseband signals $I_K+jQ_K$ and $I_{-K}+jQ_{-K}$. $I_{-K}$ and $I_K$ may be obtained by performing addition and subtraction operations on ($I_{-K}+I_K$) and ($-I_{-K}+I_K$), and $Q_{-K}$ and $Q_K$ may be obtained by performing addition and subtraction operations on ($Q_{-K}-Q_K$) and ($Q_{-K}+Q_K$), thus the two baseband signals may be obtained.

Therefore, the plurality of the combined baseband signals are obtained by demodulating the electrical signal $I_E+jQ_E$ using the plurality of electrical carriers with the respective different carrier frequencies, respectively, and then each of the plurality of combined baseband signals is separated into two corresponding baseband signals, thereby obtaining the plurality of baseband signals.

Hereinafter, the demodulation method according to the second embodiment of the present invention will be described with reference to FIG. 14. Steps S1401 and S1402 in the demodulation method are substantially the same as steps S801 and S802 in the demodulation method according to the first embodiment of the present invention, so a detailed description thereof is omitted here.

Figure 14:
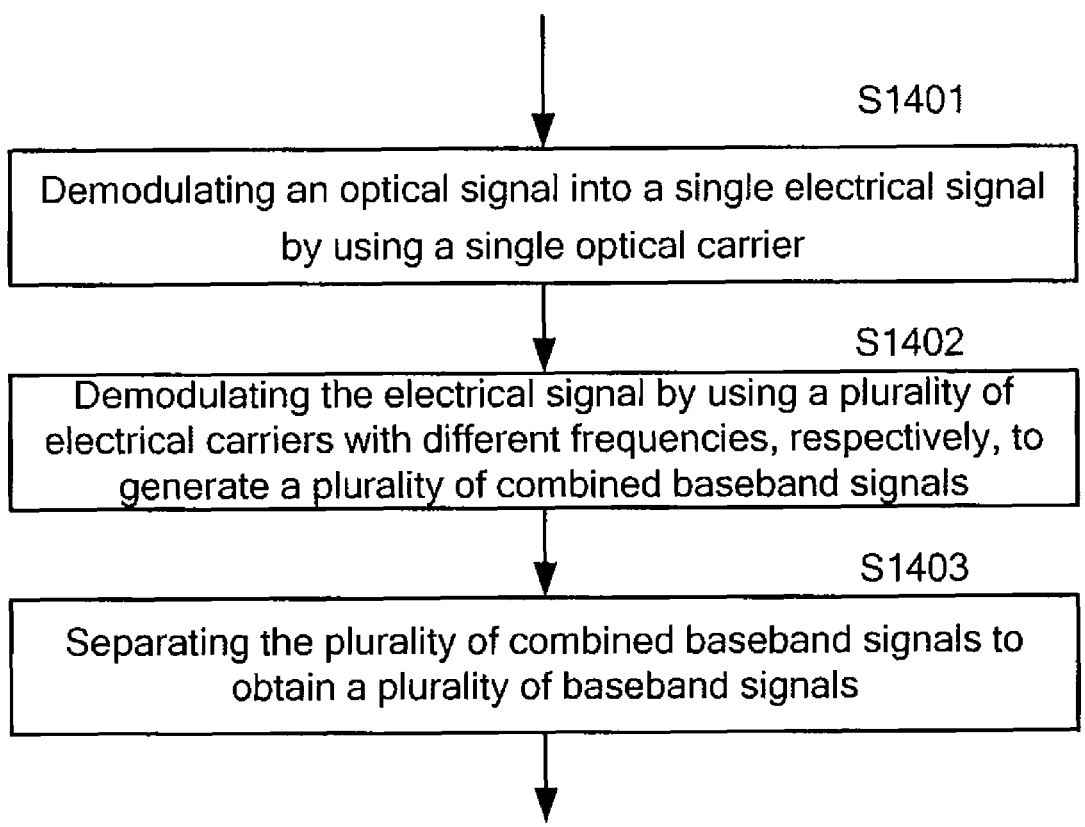
FIG. 14 is a flow chart showing a demodulation method according to a second embodiment of the present invention.

As shown in FIG. 14, a received optical signal is demodulated into a single electrical signal by using a single optical carrier in step S1401. A carrier frequency of the optical carrier is selected such that signal components, which correspond to the plurality of baseband signals, respectively, in the optical signal are distributed on both sides of the carrier frequency at a predetermined frequency interval.

Next, in step S1402, the electrical signal is demodulated by using a plurality of electrical carriers with different carrier frequencies, respectively, so as to generate a plurality of combined baseband signals.

Next, in step S1403, the plurality of combined baseband signals are separated to obtain a plurality of baseband signals. In particular, the separation units 700-0 to 700-N may be used to separate the respective combined baseband signals in the manner mentioned above, so that each of the combined baseband signals are separated into two baseband signals. The two baseband signals are two baseband signals corresponding to two signal components in the optical signal which are symmetrical about the carrier frequency of the optical carrier on the frequency axis.

Hence, the demodulation of the received optical signal to baseband signals is accomplished.

It can be seen that, in the second embodiment of the present invention, baseband signals corresponding to two electrical carriers having negative and positive frequencies which are symmetrical about the origin in the frequency domain are electrically modulated simultaneously. This, as compared with the first embodiment, not only reduces the number of mixers at the transmitting side, but also reduces the number of the mixers at the receiving side by a half, and thus decreases the cost of the device. Furthermore, since the combined baseband signals are separated after being analog-digital converted, i.e. in the stage of being digital signals, no analog subtractors are required in the second embodiment, which decreases the complexity of the device.

It is to be noted that, although the second embodiment is described above in a case of M=2N+1, the second embodiment is also applicable to a case of M=2N, in which case, only some slight modifications are needed for the above devices and methods (for example, removing the electrical modulation unit 150-0 in the modulation device illustrated in FIG. 9 and the electrical demodulation unit 650-0 in FIG. 12), and the other contents may remain unchanged.

Furthermore, it is actually assumed that no frequency difference and phase difference are present between the optical carriers generated by the local oscillating lasers at the transmitting side and the receiving side when the above embodiments of the present invention are described. However, it is possible that the frequency difference and the phase difference exist between the optical carriers in actual applications. In this case, accurate baseband signals may be obtained by performing channel compensation on the baseband signals obtained by the above demodulation, and the channel compensation may be performed in any manner commonly known in the art. That is, the above devices and methods according to the embodiments of the present invention are still applicable.

The above modulation devices and demodulation devices according to the embodiments of the present invention may be applied in a transmitter and a receiver in an optical communication system, thereby forming the transmitter comprising the modulation devices and the receiver comprising the demodulation devices, respectively.

Furthermore, although the embodiments of the present invention are described in a context of optical communication, it is to be appreciated by those skilled in the art that the present invention is also applicable to signal processing in other fields, such as a field of radio test instruments.

Although the exemplary embodiments of the invention have been shown and described, it will be apparent to those skilled in the art that various variations in form and detail may be made to these exemplary embodiments without departing from the spirit or scope of the invention, which is defined in the appended claims and their equivalents.

What is claimed is:

1. A modulation device for modulating a plurality of baseband signals to generate an optical signal, comprising:
    a combiner configured to combine the plurality of baseband signals two by two to generate a plurality of combined baseband signals, each of the combined baseband signals including a first component which is a combination of real part signals of two baseband signals, a second component which is a combination of imaginary part signals of the two baseband signals, a third component which is another combination of the real part signals of the two baseband signals, and a fourth component which is another combination of the imaginary part signals of the two baseband signals
    a plurality of modulation units configured for modulating a plurality of electrical carriers with different frequencies by using the plurality of combined baseband signals, respectively, to generate a plurality of electrical modulated signals, wherein each modulation unit combines a first component of a corresponding combined baseband signal mixed with a corresponding cosine electrical carrier and a second component of the corresponding combined baseband signal mixed with a corresponding sine electrical carrier to generate a real part signal of a corresponding electrical modulated signal, and combines a third component of the corresponding combined baseband signal mixed with the corresponding sine electrical carrier and a fourth component of the corresponding combined baseband signal mixed with the corresponding cosine electrical carrier to generate an imaginary part signal of the corresponding electrical modulated signal;
    a synthesizer configured for synthesizing the plurality of electrical modulated signals to generate a complex electrical synthesized signal including a real electrical synthesized signal and an imaginary electrical synthesized signal; and,
    an optical modulation unit configured for modulating a single optical carrier by using the electrical synthesized signal to generate the optical signal, wherein signal components corresponding to the respective baseband signals in the optical signal are distributed on both sides of a carrier frequency of the optical carrier at a predetermined frequency interval.

2. The modulation device of claim 1, wherein the signal components corresponding to the respective baseband signals in the optical signal are distributed symmetrically on both sides of the carrier frequency of the optical carrier.

3. The modulation device of claim 1, wherein a real-part signal of the electrical synthesized signal is a combination of real-part signals of the respective electrical modulated signals, and an imaginary-part signal of the electrical synthesized signal is a combination of imaginary-part signals of the respective electrical modulated signals.

4. The modulation device of claim 1, wherein two baseband signals combined by the combiner in the plurality of baseband signals correspond to two signal components that are symmetrical about the carrier frequency on the frequency axis.

5. A modulation method for modulating a plurality of baseband signals to generate an optical signal, comprising:
    combining the plurality of baseband signals two by two to generate a plurality of combined baseband signals, each of the combined baseband signals including a first component which is a combination of real part signals of two baseband signals, a second component which is a combination of imaginary part signals of the two baseband signals, a third component which is another combination of the real part signals of the two analog baseband signals, and a fourth component which is another combination of the imaginary part signals of the two analog baseband signals;

modulating a plurality of electrical carriers with different frequencies by using the plurality of combined baseband signals, respectively, to generate a plurality of electrical modulated signals, wherein a first component of a combined baseband signal mixed with a corresponding cosine electrical carrier and a second component of the combined baseband signal mixed with a corresponding sine electrical carrier are combined to generate a real part signal of a corresponding electrical modulated signal, and a third component of the combined baseband signal mixed with the corresponding sine electrical carrier and a fourth component of the combined baseband signal mixed with the corresponding cosine electrical carrier are combined to generate an imaginary part signal of the corresponding electrical modulated signal;

synthesizing the plurality of electrical modulated signals to generate a complex electrical synthesized signal including a real electrical synthesized signal and an imaginary electrical synthesized signal;

modulating a single optical carrier by using the electrical synthesized signal to generate the optical signal, wherein signal components corresponding to the respective baseband signals in the optical signal are distributed on both sides of a carrier frequency of the optical carrier at a predetermined frequency interval.

6. The modulation method of claim 5, wherein the signal components corresponding to the respective baseband signals in the optical signal are distributed symmetrically on both sides of the carrier frequency of the optical carrier.

7. The modulation method of claim 5, wherein a real-part signal of the electrical synthesized signal is a combination of real-part signals of the respective electrical modulated signals, and an imaginary-part signal of the electrical synthesized signal is a combination of imaginary-part signals of the respective electrical modulated signals.

8. The modulation method of claim 5, wherein two baseband signals combined by the combiner in the pluralit of baseband signals correspond to two signal components that are symmetrical about the carrier frequency on the frequency axis.

9. A demodulation device for demodulating an optical signal into a plurality of digital baseband signals, comprising:

an optical demodulation unit configured for demodulating the optical signal into a single electrical complex synthesized signal by using a single local optical carrier, wherein a carrier frequency of the local optical carrier is selected such that signal components corresponding to the plurality of baseband signals respectively in the optical signal are distributed on both sides of the local carrier frequency at a predetermined frequency interval;

a plurality of electrical demodulation units configured for demodulating the electrical complex synthesized signal by using a plurality of electrical carriers with different frequencies, respectively, to generate a plurality of demodulated signals, wherein each of the demodulated signals includes a first component obtained by mixing a real part signal of the electrical complex synthesized signal with a corresponding cosine electrical carrier, a second component obtained by mixing the real part signal of the electrical complex synthesized signal with a corresponding sine electrical carrier, a third component obtained by mixing an imaginary part signal of the electrical complex synthesized signal with the corresponding cosine electrical carrier, and a fourth component obtained by mixing the imaginary part signal of the electrical complex synthesized signal with the corresponding sine electrical carrier; and a plurality of separation units configured to separate each of the plurality of demodulated signals into two baseband signals, so as to obtain the plurality of baseband signals.

10. The demodulation device of claim 9, wherein the signal components corresponding to the plurality of baseband signals respectively in the optical signal are distributed symmetrically on both sides of the carrier frequency of the optical carrier.

11. The demodulation device of claim 9, wherein each of the demodulated signals is a combination of two baseband signals corresponding to two signal components which are symmetrical about the carrier frequency on the frequency axis in the optical signal.

12. A demodulation method for demodulating an optical signal into a plurality of digital baseband signals, comprising:

demodulating the optical signal into a single electrical complex synthesized signal by using a single optical carrier, wherein a carrier frequency of the local optical carrier is selected such that signal components corresponding to the plurality of baseband signals respectively in the optical signal are distributed on both sides of the carrier frequency of the local optical carrier at a predetermined frequency interval;

demodulating the electrical complex synthesized signal by using a plurality of electrical carriers with different frequencies, respectively, to generate a plurality of demodulated signals, wherein each of the demodulated signals includes a first component obtained by mixing a real part signal of the electrical complex synthesized signal with a corresponding cosine electrical carrier, a second component obtained by mixing the real part signal of the electrical complex synthesized signal with a corresponding sine electrical carrier, a third component obtained by mixing an imaginary part signal of the electrical complex synthesized signal with the corresponding cosine electrical carrier, and a fourth component obtained by mixing the imaginary part signal of the electrical complex synthesized signal with the corresponding sine electrical carrier; and separating each of the plurality of demodulated signals into two baseband signals, so as to obtain the plurality of baseband signals.

13. The demodulation method of claim 12, wherein the signal components corresponding to the plurality of baseband signals respectively in the optical signal are distributed symmetrically on both sides of the carrier frequency of the optical carrier.

14. The demodulation method of claim 13, wherein each of the demodulated signals is a combination of two baseband signals corresponding to two signal components which are symmetrical about the carrier frequency on the frequency axis in the optical signal.

* * * * *

UNITED STATES PATENT AND TRADEMARK OFFICE
CERTIFICATE OF CORRECTION

PATENT NO. : 8,768,174 B2
APPLICATION NO. : 13/333247
DATED : July 1, 2014
INVENTOR(S) : Zeng et al.

It is certified that error appears in the above-identified patent and that said Letters Patent is hereby corrected as shown below:

In the Claims

In column 21, claim 8, line 44, after "the combiner in the" replace "pluralit" with --plurality--.

Signed and Sealed this
Twelfth Day of April, 2016

Michelle K. Lee
*Director of the United States Patent and Trademark Office*